United States Patent
Pfeiffer

(10) Patent No.: US 6,205,855 B1
(45) Date of Patent: Mar. 27, 2001

(54) DEVICE FOR MONITORING A PREDETERMINED LEVEL IN A CONTAINER

(75) Inventor: Helmut Pfeiffer, Steinen (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 08/978,763

(22) Filed: Nov. 26, 1997

(30) Foreign Application Priority Data

Dec. 10, 1996 (DE) ............................................. 196 51 362

(51) Int. Cl.[7] .................................................. G01F 23/028
(52) U.S. Cl. ....................................... 73/290 V; 73/290 B
(58) Field of Search ................................ 73/290 V, 290 B

(56) References Cited

U.S. PATENT DOCUMENTS

| | | |
|---|---|---|
| 3,339,400 | 9/1967 | Banks ......................................... 73/32 |
| 3,385,104 | 5/1968 | Banks ..................................... 73/67.2 |
| 3,944,994 | * 3/1976 | Fanshawe ........................ 340/244 R |
| 4,240,285 | * 12/1980 | Langdon .............................. 73/32 A |
| 4,325,416 | * 4/1982 | Hermann ................................ 141/95 |
| 4,499,765 | * 2/1985 | Benz et al. ......................... 73/290 V |
| 4,896,536 | * 1/1990 | Benz .................................. 73/290 V |

FOREIGN PATENT DOCUMENTS

| | | |
|---|---|---|
| 14 98 548 | 3/1969 | (DE) . |
| 30 11 603 | 10/1981 | (DE) . |
| 38 33 896 | 4/1990 | (DE) . |
| 39 12 038 | 10/1990 | (DE) . |
| 43 27 167 | 2/1995 | (DE) . |

* cited by examiner

*Primary Examiner*—Hezron E. Williams
*Assistant Examiner*—Michael Cygan
(74) *Attorney, Agent, or Firm*—Bose McKinney & Evans LLP

(57) ABSTRACT

A device for monitoring a predetermined level in a container contains a sensor formed by a mechanical vibratory system comprising two vibratory rods, of which at least one vibratory rod is tubular and surrounds the other vibratory rod coaxially. Each of the two vibratory rods is secured to a common support via a resilient holding member acting as a return spring so that each rod is able to execute vibrations transversely to its longitudinal direction. An excitation arrangement causes the two vibratory rods to vibrate transversely in opposite senses at the natural resonant frequency of the mechanical vibratory system. The sensor is fitted to the container so that the tubular outer vibratory rod comes into contact with the material in the container when the material attains the level to be monitored. An evaluation circuit serves to trigger display or switching actions as a function of the vibration amplitude of the mechanical vibratory system. To compensate changes in the resonant frequency of the vibratory assembly formed by the outer vibratory rod and its resilient holding member when a deposit materializes, the inner vibratory rod is provided with a compensating mass which is shiftable in the longitudinal direction of the vibratory rod. By shifting the compensating mass the resonant frequency of the vibratory assembly formed by the inner vibratory rod and its resilient holding member can be adapted to the resonant frequency of the outer vibratory assembly.

11 Claims, 2 Drawing Sheets

DEVICE FOR MONITORING A PREDETERMINED LEVEL IN A CONTAINER

BACKGROUND OF THE INVENTION

1. Field of the Invention

The invention relates to a device for monitoring a predetermined level in a container, including a sensor formed by a mechanical vibratory system comprising two vibratory rods, of which at least one vibratory rod is tubular and surrounding the other vibratory rod coaxially, each of the two vibratory rods being secured to a common support via a resilient holding member acting as a return spring so that each rod is able to execute vibrations transversely to its longitudinal direction, an excitation arrangement causing the two vibratory rods to vibrate in opposite senses at the natural resonant frequency of the mechanical vibratory system, and an evaluation circuit for triggering display or switching actions as a function of the vibration amplitude of the mechanical vibratory system of the sensor.

2. Description of the Prior Art

A device of this kind is known from U.S. Pat. No. 4,499,765. Each vibratory rod forms with the resilient holding member acting as a return spring a mechanical vibratory assembly, the natural resonant frequency of which is dictated by the mass moment of inertia of the vibratory rod and the spring constant of the resilient holding member. The two mechanical vibratory assemblies are configured so that they have the same natural resonant frequency which is simultaneously the natural resonant frequency of the mechanical vibratory system as a whole. For a given excitation power their opposed vibrations then have a maximum vibration amplitude when the outer vibratory rod vibrates in air, whereas when the outer vibratory rod is covered by the material, the level of which is to be monitored, the vibrations of the mechanical vibratory system are damped so that their amplitude becomes smaller or the vibration even collapses altogether. Due to the differing vibration amplitudes the evaluation circuit is thus able to detect whether the material has attained the level to be monitored or not.

In known devices of this kind there is the problem that the natural resonant frequency of the mechanical vibratory assembly formed by the outer vibratory rod is altered when a deposit of the material forms on the outer vibratory rod, since this results in the mass moment of inertia of the outer vibratory rod becoming larger, whereas the natural resonant frequency of the mechanical vibratory assembly formed by the inner vibratory rod remains unaltered. The two mechanical vibratory assemblies are then no longer tuned to each other, resulting in the vibration amplitude of the mechanical vibratory system becoming smaller. There is then the risk that the evaluation circuit is unable to recognize whether the reduction in the vibration amplitude is due to a deposit having been formed, although the outer vibratory rod is vibrating in air, or is due to the outer vibratory rod being covered by the material. This can result in false indications.

SUMMARY OF THE INVENTION

It is the object of the invention to define a device of the aforementioned kind which always vibrates in air with maximum amplitude, irrespective of any deposits having formed, and thus definitively indicates by a reduction in the vibration amplitude that the level being monitored has been attained. For achieving this object the invention provides a device for monitoring a predetermined level in a container, including a sensor formed by a mechanical vibratory system comprising two vibratory rods, of which at least one vibratory rod is tubular and surrounds the other vibratory rod coaxially, each of the two vibratory rods being secured to a common support via a resilient holding member acting as a return spring so that each rod is able to execute vibrations transversely to its longitudinal direction, an excitation arrangement causing the two vibratory rods to vibrate transversely in opposite senses at the natural resonant frequency of the mechanical vibratory system, and an evaluation circuit for triggering display or switching actions as a function of the vibration amplitude of the mechanical vibratory system of the sensor, wherein at least one of said vibratory rods is provided with a compensating mass which is shiftable in the longitudinal direction of said vibratory rod and wherein adjusting means for shifting said compensating mass are provided.

In the device in accordance with the invention shifting the compensating mass automatically results in the natural resonant frequency of the two mechanical vibratory assemblies being tuned so that they always have the same natural resonant frequency even when the natural resonant frequency of one vibratory assembly has been altered due to deposits having been formed or due to any other effect. The optimum setting at which the two vibratory assemblies have the same natural resonant frequency can be detected by the vibration amplitude of the mechanical vibratory system having attained a maximum.

Advantageous modifications and improvements of the invention are characterized in the sub-claims.

BRIEF DESCRIPTION OF THE DRAWING

Further features and advantages of the invention read from the following description of an example embodiment as shown in the drawing in which.

DESCRIPTION OF THE PREFERRED EMBODIMENT

Figure 1:
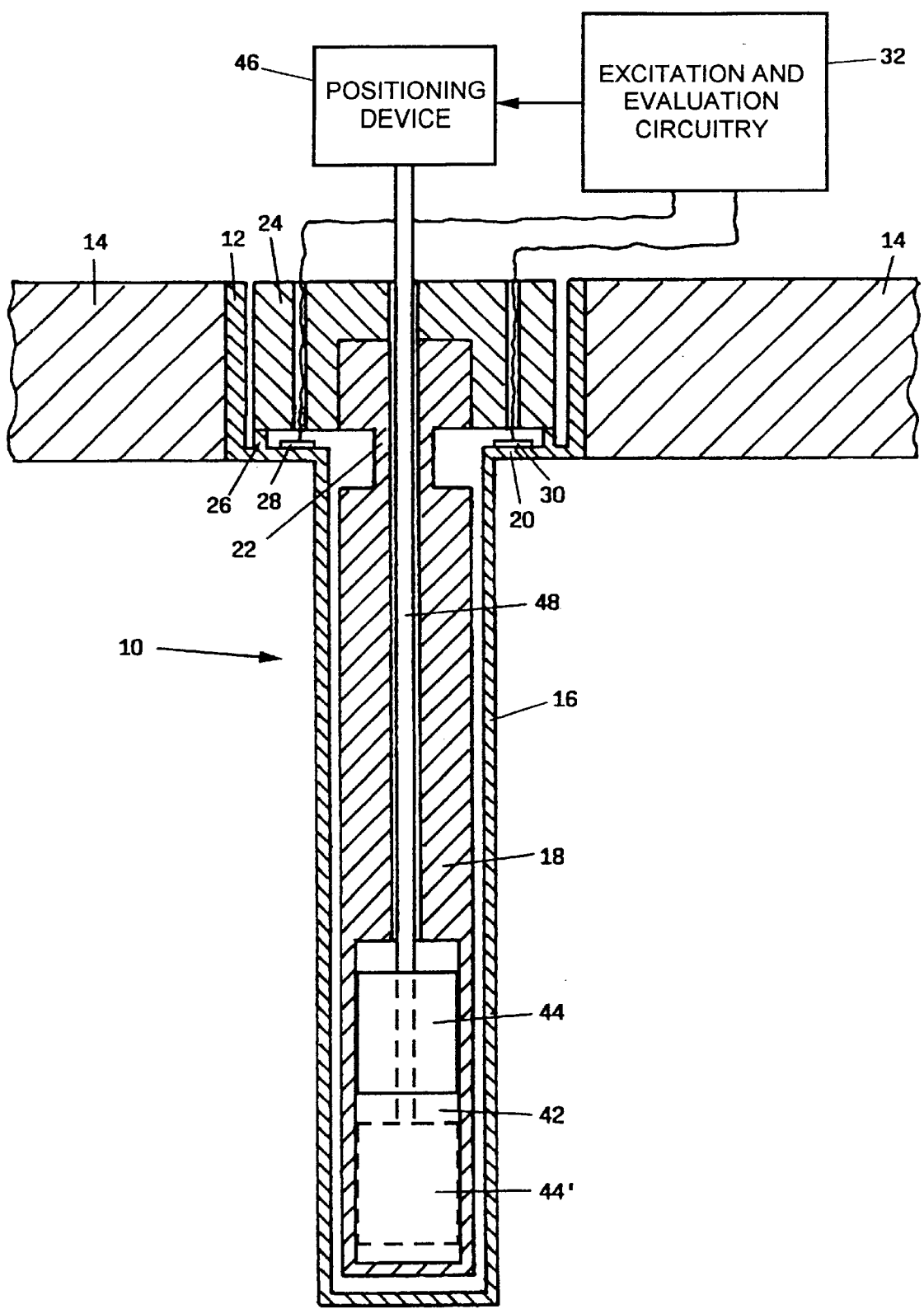
FIG. 1 is a section view through a device for monitoring a predetermined level in a container, the mechanical vibratory system of which comprises two coaxially arranged vibratory rods.

The device as shown in FIG. 1 of the drawing has a sensor 10 secured by means of a fastener part 12 in an opening of a wall 14 of a container housing the material, the level of which is to be monitored by the device. The sensor 10 comprises an outer tubular vibratory rod 16 and an inner vibratory rod 18 arranged coaxially in the interior of the former. The sensor 10 is secured to the container wall 14 so that the vibratory rods 16, 18 protrude into the interior of the container and the outer vibratory rod 16 is in contact with the material when the latter attains the level to be monitored.

The end of the outer vibratory rod 16 facing the container wall 14 is connected to the fastener part 12 by a resilient annular diaphragm 20 so that the outer vibratory rod 16 is able to execute vibrations transversely to its longitudinal direction, the diaphragm 20 acting as a return spring. The natural resonant frequency of the outer vibratory assembly formed by the outer vibratory rod 16 and the diaphragm 20 is dictated by the mass moment of inertia $\theta_a$ of the outer vibratory rod 16 and the spring constant $C_a$ of the diaphragm 20. The inner vibratory rod 18 is connected by an elastic constriction 22 to a holding block 24 so that the inner vibratory rod 18 is able to execute vibrations transversely to its longitudinal direction, the constriction 22 acting as a return spring. The natural resonant frequency of the inner vibratory assembly formed by the inner vibratory rod 18 and the constriction 22 is dictated by the mass moment of inertia $\theta_i$ of the inner vibratory rod 18 and the spring constant $C_i$ of the constriction 22. The outer vibratory assembly 16, 20 and the inner vibratory assembly 18, 22 form together the mechanical vibratory system of the sensor 10. The two vibratory assemblies are coupled to each other by the holding block 24 being connected circumferentially by an annular connector part 26 to the diaphragm 20. When one of these two vibratory assemblies is caused to vibrate at the natural resonant frequency, due to this coupling the other vibratory assembly is caused to vibrate opposite in phase when the two vibratory assemblies are correctly tuned to each other so that they have the same natural resonant frequency, i.e. when $C_a = C_i$
$\theta_a = \theta_i$ In this case the reaction torque exerted by the outer vibratory assembly 16, 20 on the mounting of the fastener part 12 in the container wall 14 is oppositely equal to the reaction torque exerted by the inner vibratory assembly 18, 22 on this mounting, and in the same way the reaction forces exerted by the vibratory assemblies on the container wall 14 are oppositely equal. The reaction torques and the reaction forces cancel each other out so that no vibration energy is transmitted to the container wall.

The vibration of the mechanical vibratory system is excited electrically by means of electromechanical transducers. In the example embodiment shown, for this purpose a piezoelectric excitation transducer 28 and a piezoelectric receiving transducer 30 are applied to the diaphragm 20. Each piezoelectric transducer consists in a manner known per se of a flat piezoelectric ceramic disk, provided with metallic coatings on both sides serving as electrodes. The one metallic coating of each piezoelectric transducer is electrically conductively connected to the diaphragm 20 serving as the ground connection. The opposite metallic coatings are electrically connected to an excitation and evaluation circuitry 32. The excitation transducer 28 is configured and applied so that on application of an electric alternating voltage the diaphragm 20 is caused to vibrate mechanically, these vibrations being transmitted to the outer vibratory rod 16, as a result of which this vibratory rod executes vibrations transversely to its longitudinal direction. The receiving transducer 30 converts mechanical vibrations of the diaphragm 20 into an electric alternating voltage which is transmitted to the excitation and evaluation circuitry 32.

Figure 2:
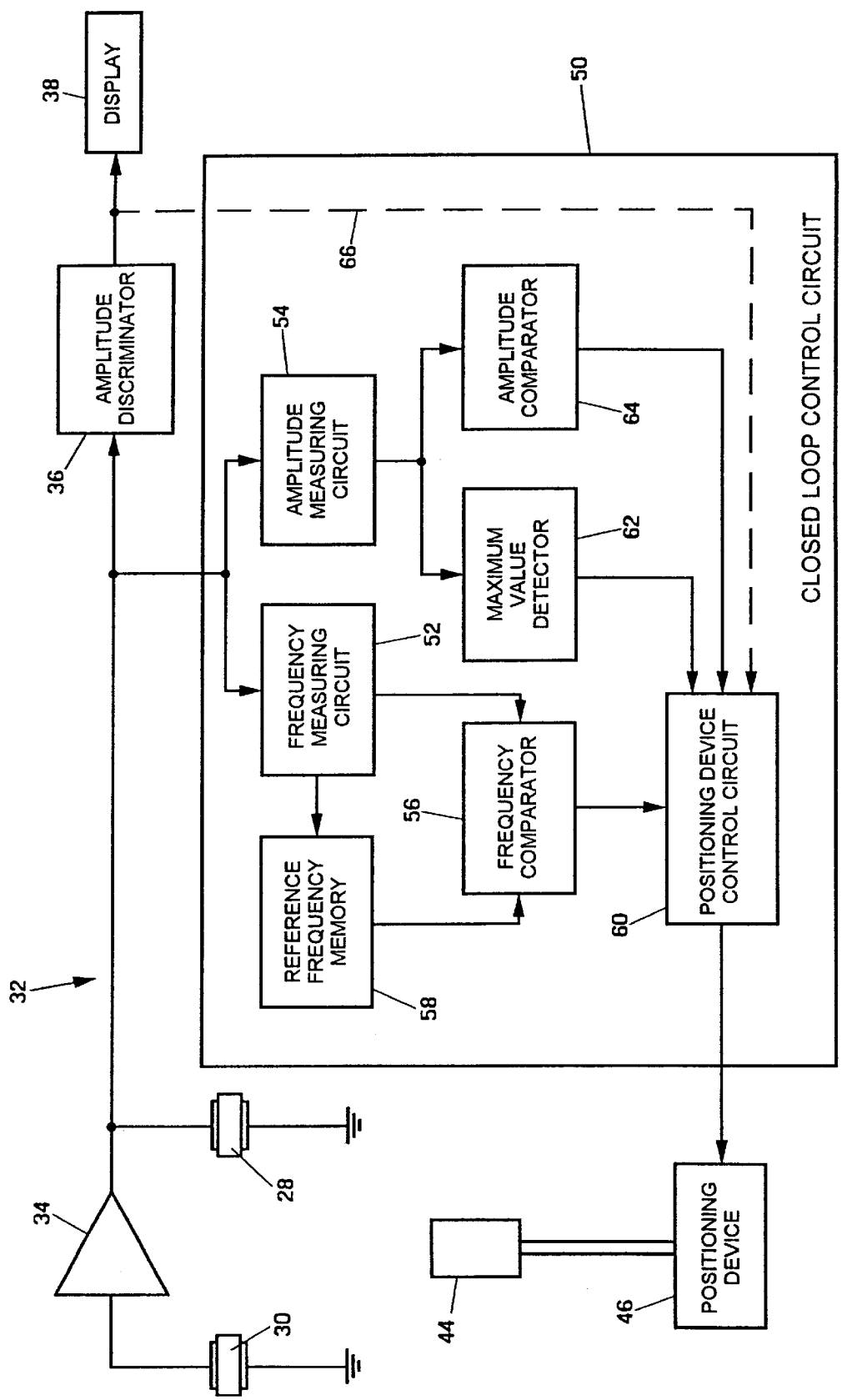
FIG. 2 is a block diagram of the excitation and evaluation circuitry of the device as shown in FIG. 1.

Shown in FIG. 2 is a block diagram of the excitation and evaluation circuitry 32, this figure also showing symbolically the excitation transducer 28 and the receiving transducer 30. The receiving transducer 30 is connected to the input of an amplifier 34, to the output of which the excitation transducer 30 is connected. The alternating voltage generated by the receiving transducer 30 having the frequency of the mechanical vibrations of the mechanical vibratory system is amplified by the amplifier 34 and applied to the excitation transducer 28, thus amplifying the vibrations of the mechanical vibratory system. Accordingly, the two electromechanical transducers 28, 30, which are coupled to each other via the mechanical vibratory system, are located in the feedback circuit of the amplifier 34. When the gain of the amplifier 34 is so high that the self-excitation condition is satisfied the mechanical vibratory system is caused to vibrate at its natural resonant frequency.

Connected to the output of the amplifier 34 is an amplitude discriminator 36 which outputs a signal indicating whether the amplitude of the alternating voltage signal which is furnished at the output of the amplifier 34 and is proportional to the vibration amplitude of the mechanical vibratory system, is above or below a predetermined threshold value. The output signal of the amplitude discriminator 36 is applied to a display 38.

The device described above operates in the following way:

When the outer vibratory rod 16 is not covered by the material in the container it is able to vibrate undamped and the mechanical vibratory system is caused to vibrate at its natural resonant frequency. These vibrations have a maximum amplitude when the two vibratory assemblies are tuned to each other in the way as described above so that they have the same resonant frequency. The amplitude discriminator 36 then detects that the amplitude of the output alternating voltage of the amplifier 34 is above the predetermined threshold value, and the display 38 connected to the output of the amplitude discriminator 36 indicates that the level to be monitored has not been attained in the container.

As soon as the outer vibratory rod 16 is covered by the material, however, its vibrations are damped to such a degree that the amplitude of the output alternating voltage of the amplifier 34 drops below the threshold value of the amplitude discriminator 36 or even becomes zero due to the vibration collapsing. The display 38 then indicates that the level to be monitored has been attained or exceeded.

As long as the condition that the inner vibratory assembly 18, 22 has the same resonant frequency as the outer vibratory assembly 16, 20 is satisfied, level monitoring is done by means of the sensor 10 with high sensitivity, since in the non-covered condition vibrations having a considerable amplitude can be maintained by relatively little energy and accordingly the vibration amplitude drops off sharply already when the outer vibratory rod is just slightly damped.

This ideal status no longer exists, however, when a material deposit has formed on the outer vibratory rod as may happen more particularly in the case of viscous, sticky or also damp powdered materials. Due to such a deposit forming, the tuning of the resonant frequencies of inner and outer vibratory assembly is disturbed. The resonant frequency of the outer vibratory assembly is reduced due to its mass moment of inertia $\theta_a$ becoming larger, whereas the resonant frequency of the inner vibratory assembly remains unchanged. This mis-tuning results in the vibration amplitude of the mechanical vibratory system and thus the amplitude of the alternating voltage output by the amplifier 34 becoming smaller, even when the sensor 10 vibrates in air. As a result of this the sensitivity of the sensor 10 is reduced and there is a risk of false indications due to the amplitude discriminator being unable to detect whether the reduction in the vibration amplitude is due to a deposit having formed or due to the sensor being covered by the material.

To get round this problem the sensor 10 as shown in FIG. 1 is configured so that the tuning of the outer vibratory assembly 16, 20 and of the inner vibratory assembly 18, 22 to the same natural resonant frequency is maintained. For this purpose a cavity 42 is formed at the front end of the inner vibratory rod 18, and an axially shiftable compensating mass 44 is located in the cavity 42. Shifting the compensating mass 44 is done by a positioning device 46 via a rod 48 extending axially through the inner vibratory rod 18. The positioning device 46 is controlled by the excitation and evaluation circuitry 32.

For setting the compensating mass 44 use can be made of the fact that every change in the resonant frequency of the outer vibratory assembly 16, 20 changes the natural resonant frequency of the mechanical vibratory system as a whole. The mechanical vibratory system is thus caused to vibrate at the changed natural resonant frequency via the amplifier 34, these natural resonance vibrations, however, having a smaller amplitude due to the lack of tuning between the natural resonant frequencies of the outer and inner vibratory assemblies. As soon as the excitation and evaluation circuitry detects this change in the natural resonant frequency it causes the positioning device 46 to shift the compensating mass 44 in the direction in which the resonant frequency of the inner vibratory assembly 18, 22 is caused to approximate the resonant frequency of the outer vibratory assembly 16, 20. Thus, wher the resonant frequency of the outer vibratory assembly 16, 20 is reduced due to a deposit having formed, the positioning device 46 is controlled by the excitation and evaluation circuitry 32 such that it shifts the compensating mass 44 outwardly toward the free end of the vibratory rod 18. As a result of this the mass moment of inertia $\theta_i$ of the inner vibratory assembly 18, 22 is increased and correspondingly the resonant frequency of the inner vibratory assembly 18, 22 is reduced until, in the end, equality of the resonant frequencies of the two vibratory assemblies is reestablished. When, however, the resonant frequency of the outer vibratory assembly 16, 20 again decreases due to a reduction in the deposit the compensating mass 44 is shifted inwardly. Attaining the tuned condition can always be detected by the the vibrations of the mechanical vibratory system having attained a maximum amplitude.

In FIG. 1 the position of the compensating mass 44 drawn in solid lines corresponds to the highest natural resonant frequency of the inner vibratory assembly 18, 22; the position depicted in broken lines at 44' is the position of the compensating mass 44 which corresponds to the lowest natural resonant frequency of the inner vibratory assembly 18, 22.

Shifting the compensating mass 44 by the positioning device 46 can be done in various ways as will be readily appreciated by the person skilled in the art. For instance, the rod 48 may be provided as a kind of threaded spindle having a screw thread running in a fixed threaded bore, and the positioning device 46 may be a motor causing the threaded spindle to rotate so that the threaded spindle together with the compensating mass is moved axially. Or the threaded bore may be provided in the compensating mass 44, in which case only the part of the rod 48 located within the cavity 42 is configured as a threaded spindle so that the compensating mass 44 wanders along the rod 48 when the latter is caused to rotate by the positioning device 46. Furthermore, the rod 48 may be located longitudinally shiftable in the inner vibratory rod 18 and shifted longitudinally by the positioning device 48 in some other suitable way.

In the block diagram as shown in FIG. 2 an example embodiment of a closed loop control circuit 50 is illustrated which permits tuning the mechanical vibratory system to the maximum amplitude of the natural resonant vibration by shifting the compensating mass 44 when there is a change in the natural resonant frequency.

The closed loop control circuit 50 contains a frequency measuring circuit 52 and an amplitude measuring circuit 54, both of which receive the output signal of the amplifier 34. The frequency measuring circuit 52 continually measures the frequency of the output signal of the amplifier 34, which frequency is equal to the momentary natural resonant frequency of the sensor 10. The frequency value measured in this way is applied to a frequency comparator 56 which also receives a reference frequency value stored in a reference frequency memory 58. The frequency comparator 56 compares the frequency value measured by the frequency measuring circuit 52 to the reference frequency value and furnishes a signal as a function of this comparison to a positioning device control circuit 60.

The amplitude measuring circuit 54 continually measures the amplitude of the output signal of the amplifier 34 which depends on the amplitude of the natural resonance vibration of the mechanical vibratory system and furnishes the measured amplitude value to a maximum value detector 62 and to an amplitude comparator 64. The outputs of the maximum value detector 62 and of the amplitude comparator 64 are likewise connected to the positioning device control circuit 60.

The functioning of the closed loop control circuit 50 is as follows:

The reference frequency stored in the reference frequency memory 58 corresponds to the natural resonant frequency last measured by the frequency measuring circuit 52, this natural resonant frequency being that of the mechanical vibratory system of the sensor 10 when vibrating in air. In the frequency comparator 56 the reference frequency stored in the reference frequency memory 58 is continually compared to the frequency measured by the frequency measuring circuit 52. As long as the natural resonant frequency of the mechanical vibratory system does not change, the frequency values compared to each other are equal and the frequency comparator 56 furnishes the positioning device control circuit 60 either with no signal or a signal indicating equality.

When there is a change in the resonant frequency of the outer vibratory assembly 16, 20, however, for instance due to a deposit having formed, the frequency value measured by the frequency measuring circuit 52 no longer equals the reference frequency value stored in the reference frequency memory 58. As soon as the difference detected by the frequency comparator 56 exceeds a predetermined minimum value, the frequency comparator 56 furnishes the positioning device control circuit 60 with a signal which indicates lack of equality and also shows in which direction the resonant frequency of the outer vibratory assembly has changed. The positioning device control circuit 60 controls the positioning device 46 so that the compensating mass 44 is shifted in the direction in which the resonant frequency of the inner vibratory assembly 18, 22 is caused to approximate the new resonant frequency of the outer vibratory assembly 16, 20.

Due to the change in the resonant frequency of the outer vibratory assembly and the resulting mis-tuning, the vibration amplitude has also been reduced. During shifting of the compensating mass the vibration amplitude measured by the amplitude measuring circuit 54 reincreases. As soon as the maximum value detector 62 detects that the measured vibration amplitude has attained a maximum value it furnishes the positioning device control circuit 60 with a signal which discontinues further shifting of the compensating mass 44 by the positioning device 46.

The mechanical vibratory system is now tuned to the new natural resonant frequency so that the outer vibratory assembly 16, 20 and the inner vibratory assembly 18, 22 vibrate opposite in phase with the same resonant frequency and maximum amplitude, as a result of which optimum sensitivity of the sensor 10 is reestablished despite a deposit having formed.

The maximum value detector 62 is able to detect the maximum value being achieved as a rule only by the vibration amplitude beginning to drop again after the maximum value has been exceeded. This is why the arrangement is preferably to be configured so that the signal furnished by the maximum value detector 62 to the positioning device control circuit 60 results in a reversal of the direction of shift every time the maximum value is exceeded. Since the system constitutes a closed loop control circuit it is automatically regulated to a position corresponding to the maximum vibration amplitude. Due to it always being the case that the deposit forms slowly in practice, very fast control is not needed.

The process as described is repeated in the same direction when the deposit on the outer vibratory rod 16 increases further, and it proceeds in the reverse direction when the deposit is reduced by it being removed or dropping off, for instance.

Once the system has regulated itself to the maximum value of the vibration amplitude, the natural resonant frequency measured in this condition is entered from the frequency measuring circuit 52 into the reference frequency memory 58 where it is stored as a new reference frequency. Subsequently, the vibration frequency measured by the frequency measuring circuit 52 is compared to the new reference frequency and shifting the compensating mass 44 as described above is re initiated when the difference sensed by the frequency comparator 56 again exceeds the predetermined minimum value.

When the outer vibratory rod 16 starts to dip into the material in the container, no frequency tuning is allowed, of course, by the compensating mass 44 being shifted. For this purpose use is made of the fact that the action of the sensor 10 dipping into the material is accompanied by a sudden, sharp reduction in the vibration amplitude which is exploited by the amplitude discriminator 36 to detect attainment of the monitored level. This reduction in amplitude may be so considerable, as already mentioned, that the vibration collapses and is not reinstated until the sensor is no longer covered by material.

This is why the amplitude value measured by the amplitude measuring circuit 54 is supplied to an amplitude comparator 64 which compares the measured amplitude value to a predetermined threshold value. When the measured amplitude value is less than the threshold value the amplitude comparator 64 furnishes the positioning device control circuit 60 with a signal which disables shifting of the compensating mass 44. Shifting of the compensating mass 44 is not reenabled until the measured amplitude value is again above the threshold value.

It would also be possible to omit the amplitude comparator 64 and instead to apply the output signal of the amplitude discriminator 36 to the positioning device control circuit 60 to enable or disable frequency tuning, as is indicated by the broken line connection 66 in FIG. 2. Frequency tuning is then disabled when the output signal of the amplitude discriminator 36 indicates that the sensor 10 is covered by material, and it is enabled when the output signal of the amplitude discriminator 36 indicates that the sensor 10 is vibrating in air. Using a separate amplitude comparator 64 permits, however, a more sensitive influencing of deposit compensation by the shifting of the compensating mass being disabled already when a reduction in amplitude occurs at which the amplitude discriminator 36 does not yet respond. It is then in particular possible to adjust the threshold value of the amplitude comparator 64 as a function of the maximum value last sensed in each case.

It will readily be appreciated by the person skilled in the art from his knowledge of the described basic principle in compensating deposits that various modifications of the embodiment as described above are possible. Thus, it would be basically possible to apply the shiftable compensating mass to the outer vibratory rod instead of to the inner vibratory rod or to provide both vibratory rods with shiftable compensating masses. However, such embodiments would prove to be more difficult to achieve technically.

What is claimed is:

1. A device for monitoring a predetermined level in a container, including a sensor formed by a mechanical vibratory system comprising an inner vibratory rod and an outer vibratory rod, said outer vibratory rod surrounding and being coaxial with said inner vibratory rod, each of said inner and outer vibratory rods being secured to a common support via a resilient holding member acting as a return spring so that each rod is able to execute vibrations transversely to its longitudinal direction, an excitation arrangement causing said inner and outer vibratory rods to vibrate transversely in opposite senses at the natural resonant frequency of the mechanical vibratory system, an evaluation circuit sensing the vibration of the mechanical vibratory system and tuning the mechanical vibratory system as a function of the sensed vibration, a compensating mass connected to at least one of said inner and outer vibratory rods, said compensating mass being shiftable in the longitudinal direction of said at least one of said inner and outer vibratory rods and a positioning device connected to said compensating mass, said positioning device being triggered by said evaluation circuit to shift said compensating mass in the longitudinal direction of said at least one of said inner and outer vibratory rods.

2. The device as set forth in claim 1, wherein said compensating mass is connected to said inner vibratory rod.

3. The device as set forth in claim 2, wherein a portion of said inner vibratory rod remote from said resilient holding member is hollow, and wherein said compensating mass is shiftably mounted in said hollow portion.

4. The device as set forth in of claim 2, further comprising a mounting rod extending axially through said inner vibratory rod, said compensating mass being connected to one end of said mounting rod and said positioning device being connected to the opposite end of said mounting rod.

5. The device as set forth in claim 1, wherein said evaluation circuit comprises an electro-mechanical receiving transducer connected to said mechanical vibratory system, said receiving transducer converting the vibrations of said mechanical vibratory system into an electric alternating signal having a frequency and an amplitude which depends on the vibration frequency and the vibration amplitude of said mechanical vibratory system, and wherein said positioning device is controlled as a function of said alternating signal.

6. The device as set forth in claim 5, wherein said evaluation circuit further comprises a closed loop control circuit which controls said positioning device as a function of the amplitude of said alternating signal such that said positioning device shifts said compensating mass to achieve a maximum amplitude.

7. The device as set forth in claim 6, wherein said evaluation circuit further comprises a frequency measuring circuit which measures the frequency of said alternating signal and triggers shifting of said compensating mass when a change in the frequency of said alternating signal is detected.

8. The device as set forth in claim 7, wherein said evaluation circuit further comprises a reference frequency memory which stores a resonant frequency corresponding to the last setting of said compensating mass, and a frequency comparator which finds a difference between the frequency measured by said frequency measuring circuit and the resonant frequency stored in said reference frequency memory and which triggers shifting of said compensating mass when the difference exceeds a predetermined minimum value.

9. The device as set forth in claim 7, wherein said evaluation circuit further comprises an amplitude measuring circuit which measures the amplitude of said alternating signal and which disables shifting of said compensating mass when a maximum amplitude is detected.

10. The device as set forth in claim 9, wherein said evaluation circuit further comprises an amplitude comparator which compares the amplitude measured by said amplitude measuring circuit to a threshold value and disables shifting of said compensating mass when said measured amplitude is below said threshold value.

11. The device as set forth in of claim 3, further comprising a mounting rod extending axially through said inner vibratory rod, said compensating mass being connected to one end of said mounting rod and said positioning device connected to the opposite end of said mounting rod.

* * * * *